(12) United States Patent
Thiebot et al.

(10) Patent No.: US 10,789,341 B2
(45) Date of Patent: Sep. 29, 2020

(54) METHOD AND A DEVICE FOR RECOGNIZING AN INDIVIDUAL BY BIOMETRIC SIGNATURE

(71) Applicant: IDEMIA IDENTITY & SECURITY FRANCE, Issy-les-Moulineaux (FR)

(72) Inventors: Alain Thiebot, Issy-les-Moulineaux (FR); Marina Pouet, Issy-les-Moulineaux (FR); Joël-Yann Fourre, Issy-les-Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 280 days.

(21) Appl. No.: 15/905,480

(22) Filed: Feb. 26, 2018

(65) Prior Publication Data
US 2018/0247040 A1    Aug. 30, 2018

(30) Foreign Application Priority Data
Feb. 27, 2017   (FR) ..................... 17 51591

(51) Int. Cl.
*G06F 21/32* (2013.01)
*G06K 9/00* (2006.01)
*G06F 21/31* (2013.01)
*G06F 21/60* (2013.01)

(52) U.S. Cl.
CPC .............. *G06F 21/32* (2013.01); *G06F 21/31* (2013.01); *G06F 21/602* (2013.01); *G06K 9/00006* (2013.01); *G06K 9/00013* (2013.01); *G06K 9/00087* (2013.01); *G06K 9/00167* (2013.01); *G06K 9/00181* (2013.01); *G06K 9/00194* (2013.01)

(58) Field of Classification Search
CPC ........ G06F 21/32; G06F 21/31; G06F 21/602; G06K 9/00006; G06K 9/00167; G06K 9/00194; G06K 9/00181; G06K 9/00013; G06K 9/00087
USPC ......................................................... 726/18
See application file for complete search history.

(56) References Cited

U.S. PATENT DOCUMENTS 6,728,881 B1 * 4/2004 Karamchetty .......... G06F 21/34
                                                          713/182
2004/0042642 A1 * 3/2004 Bolle ........................ G06K 9/00
                                                          382/115

OTHER PUBLICATIONS

M. Freire-Santos, et al., Cryptographic key generation using handwritten signature, Biometric Technologies for Human Identification III, Proceedings of SPIE, (2006 ) pp. 1-7, vol. 6202, 62020N, Madrid, Spain.

(Continued)

*Primary Examiner* — Mohammad W Reza
(74) *Attorney, Agent, or Firm* — Muncy, Geissler, Olds & Lowe, P.C.

(57) ABSTRACT

A method of recognizing individuals by means of at least one processor executing a recognition algorithm comprising the steps of:
 detecting biometric characteristics of a finger of a candidate for recognition while writing a signature by pressing the finger against a signature surface;
 encoding both the written signature and also the biometric characteristics in order to form signature data and biometric data of the candidate; and
 using the algorithm to compare the signature data and the biometric data of the candidate with signature data and fingerprint biometric data belonging to at least one individual and stored on a data medium.

14 Claims, 1 Drawing Sheet

(56) References Cited

OTHER PUBLICATIONS

Lucas Kevin Ballard, Robust techniques for evaluating biometric cryptographic key generators, Dissertation submitted to The Johns Hopkins University, (Mar. 2008), pp. 1-128, Baltimore, Maryland.

\* cited by examiner

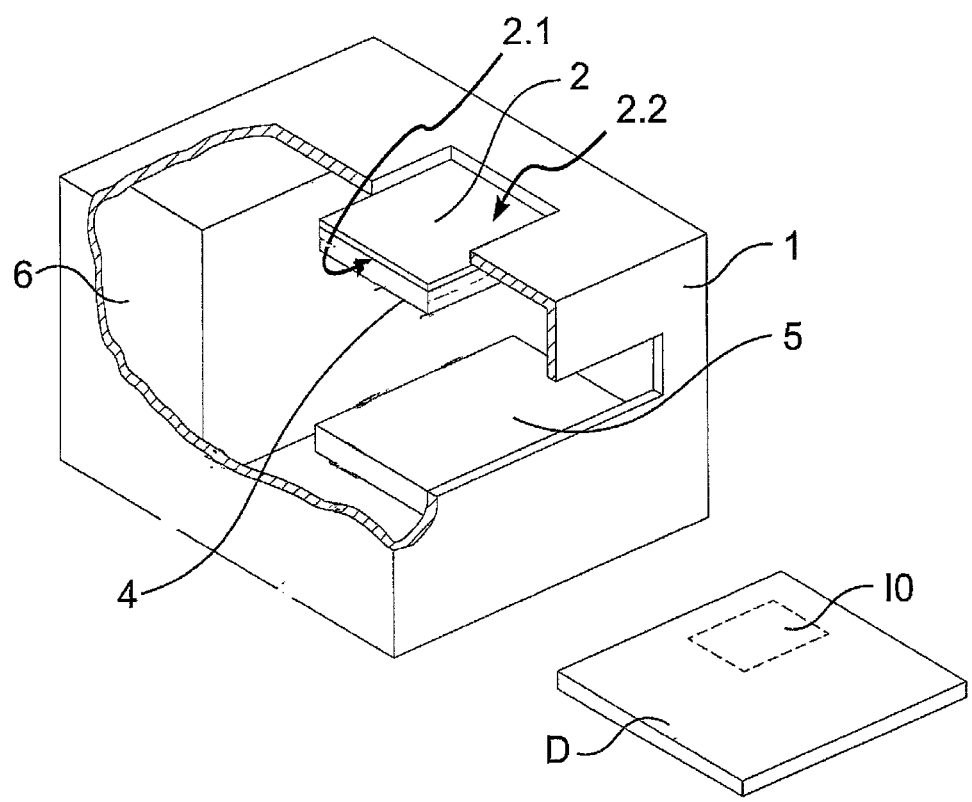

METHOD AND A DEVICE FOR RECOGNIZING AN INDIVIDUAL BY BIOMETRIC SIGNATURE

The present invention relates to the field of recognizing individuals, e.g. for checking identity or for controlling access. One possible use relates to controlling access to premises, such as an airport boarding zone, or to a machine, such as a computer or a smartphone type telephone, or to a set of machines such as a computer network.

STATE OF THE ART

It has been known for a very long time to authenticate an individual on the basis of that person's signature at the bottom of identity documents, payment vouchers, contracts, . . . .

Electronic devices exist that recognize handwritten signatures, e.g. comprising an optical sensor connected to a control unit that is arranged to compare an image of the optical signature of a candidate for recognition with pre-stored images of people's signatures. It is now common practice for a terminal having a touch screen, such as a smartphone or a touch pad, to be unlocked by inspecting the shape of a signature written on its touch-sensitive surface.

In parallel, proposals have been made to recognize an individual from biometric characteristics such as fingerprints.

In this context, there also exist electronic devices for recognizing fingerprints, e.g. comprising a fingerprint sensor connected to a control unit arranged to compare characteristics of a fingerprint of a candidate for recognition with pre-stored characteristics of fingerprints of people who have been enrolled.

Those two types of recognition device are used independently of each other.

OBJECT OF THE INVENTION

An object of the invention is to provide means for strengthening recognition of an individual.

BRIEF SUMMARY OF THE INVENTION

To this end, the invention provides a method of recognizing individuals by means of at least one processor executing a recognition algorithm comprising the steps of:
 causing at least one candidate for recognition to write a signature, the candidate using at least one finger pressed against a capture surface;
 detecting fingerprint biometric characteristics of the candidate while the signature is being written;
 extracting the characteristics of the written signature and the biometric characteristics of the fingerprint in order to form both signature data and also fingerprint biometric data of the candidate; and
 comparing the signature data and the biometric data of the candidate with signature data and fingerprint biometric data belonging to at least one individual and stored on a data medium.

The term "written signature" is used to mean a pattern or string of handwritten letters and/or digits that can be reproduced by an individual and that enables the individual to be identified from the way in which the signature is traced while the individual is writing it. Thus, recognition is based both on physical characteristics of individuals (their fingerprints) and on knowledge specific to those individuals (their written signatures). Recognition is thus more reliable, but takes hardly any longer than verifying a signature alone, since the biometric characteristics are detected while the signature is being written, using the same sensor and without any additional step or constraint for the user. The method of the invention also makes it possible to limit any risk of fraud in a fingerprint recognition system. Specifically, the two most widespread fraudulent techniques consist either in covering the end of the fraudster's finger with a film reproducing a fingerprint, or else in making a fake finger with its end reproducing a fingerprint. With the first technique, the film rubbing against the signature surface tends to degrade the film and thus the fingerprint it carries. With the second technique, it is difficult with a fake finger to reproduce the movement of writing a signature (e.g. variations in the speed and the pressure of the finger on the signature surface). With both techniques, the differences in mechanical properties between skin and the fake materials lead to different and detectable deformations in the fingerprints acquired while writing the signature. Finally, the signature provides characteristics that are revocable or modifiable, unlike biometric characteristics, which are immutable. Encrypting/decrypting biometric data as a result of successful verification of the written signature provides greater security for the biometric data and also makes it easy for the combination of the biometric data and of the signature data to be revoked.

The invention also provides a device for detecting biometric characteristics, the device including a sensor having a capture surface, and the sensor having an acquisition speed that is sufficient to capture biometric characteristics from the end of a finger writing a signature on the signature surface. The device includes a processor unit for encoding and storing both signature data corresponding to the signature and also biometric data corresponding to the captured biometric characteristics in order to perform the above method.

Thus, by way of example, a fingerprint sensor operating at 30 frames per second and having an integration time of 5 milliseconds (ms) can produce images enabling biometric characteristics to be extracted without significant degradation of performance from fingers that are moving at a speed of less than 0.1 meters per second (m/s). The same characteristics can be acquired adequately, but with poorer quality, at speeds up to 0.3 m/s.

Other characteristics and advantages of the invention appear on reading the following description of particular, non-limiting embodiments of the invention.

BRIEF DESCRIPTION OF THE FIGURE

Reference is made to the sole accompanying FIGURE, which is a diagram showing a device of the invention for detecting biometric characteristics and for recognition.

DETAILED DESCRIPTION OF THE INVENTION

With reference to the FIGURE, the device of the invention comprises a structure 1 carrying a sensor 2.

In this example, the sensor 2 is a thin-film transistor (TFT) sensor made in the form of a glass plate having a rear face 2.1 and a front face 2.2. The front face 2.2 forms the capture surface and the sensor has an acquisition speed that is sufficient to enable biometric characteristics to be captured from the end of a finger that is writing a signature on the front face 2.2 that forms the capture surface.

A display 4 is mounted facing the rear face 2.1 of the sensor 2. The display 4 and the sensor 2 are arranged so that the sensor 2 does not impede a user viewing the display 4 by looking through the sensor 2. For this purpose, the sensor 2 is a sensor that is partially transparent. As mentioned above, the sensor 2 is of the TFT type, i.e. it is made on a plate, a glass plate in this example, by a known microelectronic method so that an empty space is conserved between the pixels in such a manner that no metallic layer prevents light from the display 4 passing through the sensor 2. The sensor 2 allows at least 10% of the light from the display 4 to pass through. When the sensor 2 is an optical sensor, it is advantageously illuminated by the display 4. The sensor 2 may equally well be thermal or capacitive. Under certain circumstances, thermal and capacitive embodiments make it possible to make use of integration times that are shorter than 1 ms and thus to allow even faster movements for the finger.

The device also has an integrated circuit reader 5 of the radio frequency identification (RFID) type. These integrated circuits, which are themselves known, comprise a memory and an antenna, and they are arranged to enable data to be written in the memory and to enable data that is written in the memory to be read. These integrated circuits (ICs) are contained in identity documents D such as passports or IC cards. It should be observed that some of the processing described below may be performed by these integrated circuits.

The device also comprises a processor unit 6 connected to the sensor 2, to the display 4, and to the reader 5. The processor unit 6 is a computer server that comprises a processor associated with random access memory (RAM) and read only memory (ROM) containing a program executing a biometric recognition and signature recognition algorithm and performing a method of the invention for recognizing individuals.

The method of the invention allows the device to operate in two modes:
in a first mode of operation, recognition is performed on the basis of signature data and of biometric data belonging to a plurality of individuals and stored in a database stored in the ROM of the processor unit; and
in a second mode of operation, activated by inserting an identity document into the reader 5, recognition is performed on the basis of written signature data and of biometric data belonging to a single individual and stored in the memory of the identity document.

The method includes a prior enrolment operation that comprises the steps of:
having an individual who is to be enrolled write a signature, the individual using at least one finger pressed against the capture surface;
detecting characteristics of the signature while it is being written;
encoding those characteristics so as to generate signature data therefrom (or reference signature data) and storing it in the database contained in the ROM of the processor unit 6 or in the memory of an integrated circuit in a document D, or in both, depending on the intended mode of operation;
detecting biometric characteristics of one or more fingers of the individual; and
encoding the biometric characteristics in order to form biometric data of the individual (or reference biometric data) and storing it in the database contained in the ROM of the processor unit 6 or in the memory of an integrated circuit in a document D, or in both, depending on the intended mode of operation.

For each enrolled individual, the database in the ROM of the processor unit 6 associates: an identifier of the individual, the signature data, the biometric data, and optionally any rights that are associated with the individual.

The signature data includes the general form of the written signature and at least one of the following data values:
a value for the acceleration of the finger over at least a portion of the signature;
a value for the pressure of the finger against the signature surface over at least a portion of the signature; and
a value for the shape of the finger.

By way of example, the associated rights comprise:
full or limited bounds of authorized access;
authorization to access documents; . . . .

During enrolment, biometric characteristics may be captured:
during a period while the finger is stationary against the signature surface, immediately before starting or immediately after finishing writing the signature;
during at least one stage of the finger moving slowly (which speed may be zero or nearly zero, the finger then being in a stationary or almost stationary state), while writing the signature; and
during a plurality of capture stages while writing the signature, or substantially continuously while writing the signature.

With substantially continuous capture, at least one of the capture stages is preferably performed while the finger is moving. The sensor is preferably arranged so that the capture is usable so long as the speed of the finger does not exceed 0.3 m/s.

The method then includes a step of comparing the biometric data at two distinct instants while writing the signature in order to identify distortions of the biometric characteristics between the two capture instants. In a manner that is conventional when processing fingerprints, the images are matched as well as possible. If the minutiae are used for comparison, this may be done by matching one particular minutia of each acquisition so that such matching produces the best match for the other minutiae. In the invention, use is made of movement vectors associated with each pair of matching minutiae between two acquisitions in order to constitute a distortion field. It may then optionally be approximated by a parametric model for which the parameters are conserved. In a variant, it may suffice to verify that sufficient distortion exists, i.e. to verify that for vectors that are far enough apart (beyond a first threshold) of the matching point, the movement is greater than a second threshold.

In this example, biometric characteristics with sufficient quality are captured by using a sensor 2 having fine resolution, specifically 500 dots per inch (dpi), with an integration time that is relatively short compared with the maximum speed of movement of a finger while writing a signature. In a variant, it is possible to determine the integration time with reference to an average speed of writing a signature, or indeed relative to a slower speed (with biometric characteristics being captured during periods of "slower" movement while writing the signature).

The method also includes a recognition operation. The device is arranged to detect the presence of a finger on the capture surface: the first mode of operation is activated when no identity document has previously been inserted into the reader 5, and the second mode of operation is activated when an identity document has previously been inserted into the reader 5.

During the recognition operation, the method comprises the steps of:
- causing at least one candidate for recognition to write a signature, the candidate using at least one finger pressed against the capture surface;
- detecting biometric characteristics of the candidate's finger(s) while writing the signature;
- using the algorithm to encode the signature as written and the biometric characteristics in order to form candidate signature data and candidate biometric data; and
- using the algorithm to compare the candidate's signature data and biometric data with signature data and fingerprint biometric data that has previously been stored during an enrolment operation.

Advantageously, the biometric data may be protected by the written signature data. Thus, during enrolment, a known method may be used to generate an encryption key that can be associated with the reference signature data of the individual being enrolled. The reference biometric data is encrypted by using this key, and is then stored in encrypted form. Thus, when there is a positive comparison between the written signature and the reference signature data, the encryption key corresponding to said reference signature data is recovered and makes it possible in turn to decrypt the reference biometric data that has been stored in order subsequently to perform the biometric comparison. The biometric data is thus inaccessible so long as a comparison has not been successful on the signature data. Such a method of recovering an encryption key is known by way of example under the term "fuzzy vault" as described in the article "Cryptographic key generation using handwritten signature", by M. Freire-Santos et al., Proc. of SPIE, Vol. 6202, 62020N, 2006. The use of signature data for accessing biometric data also makes it possible to repudiate that data.

In a variant, it is possible to generate the encryption key directly from the written signature data. Such an encryption key is produced using known methods. By way of example, while enrolling the individual, an encryption key and a corrector code are generated on the basis of the written signature data in the manner described in the thesis "Robust techniques for evaluating biometric cryptographic key generators", Lucas Kevin Ballard, Baltimore, Md., March 2008. During subsequent acquisitions, the signature data associated with the error corrector code serves to generate the same encryption key.

In the first mode of operation, the signature data and the biometric data of the candidate are compared with the signature data and the fingerprint biometric data as previously stored in the ROM of the processor unit 6. In the second mode of operation, the signature data and the biometric data of the candidate are compared with the signature data and the fingerprint biometric data as previously stored in the memory of the circuit 10 of the identity document D.

Both the characteristics of the signature and also the biometric characteristics are detected while the signature is being written. The display 4 arranged behind the sensor 2 is controlled by the processor unit 6 so as to display the signature while it is being written.

It should be observed that since the fingerprint is captured from a moving finger pressed against a surface, the fingerprint is deformed because of the flexibility of the pulp of the finger. It is therefore necessary to take this into account while processing biometric characteristics so that the biometric data coming from an individual writing a signature can be correctly matched with the characteristics of the same individual as stored in the database. It should be observed that if the fingerprint is not deformed while the signature is being written, it is very likely that a fraud is being attempted by using a fingerprint image that is merely being moved over the signature surface in order to reproduce the signature. To further limit any risk of fraud, it is advantageous to verify, while the signature is being written, that the fingerprint is deformed in a manner that is not too different from its deformation while acquiring the reference, since that would be indicative of an attempted fraud using material that is too flexible or too rigid compared with the reference finger. Provision may thus be made during enrolment to determine and store deformation vectors of the fingerprint while the signature is being written so as to make it possible, during a subsequent recognition stage, to compare the stored deformation vectors with deformation vectors detected while a candidate is writing the signature.

In more practical manner, it is possible to measure distortion relative to one of the images of the signature sequence (or relative to one of the reference images). It is possible to quantify distortion for the purpose of comparison with thresholds. It is possible to obtain results that are similar by using a plurality of biometric templates during enrolment and by verifying that the maximum similarities found by the comparison algorithm do indeed correspond to identical periods in the writing of the signature. In order to guarantee good performance, it is also advantageous to use a plurality of reference templates obtained under conditions such that there is distortion between them. This makes it possible, for a distorted acquisition, to have one or more reference templates for which the distortions are more moderate, so as to produce a better comparison score.

In a variant, in order to verify that there is no attempted fraud even before accessing the stored data, it is advantageous to verify consistency between the way distortion varies and the variations of speed and travel direction of the finger while the signature is being written. Thus, the method comprises the steps of:
- comparing biometric characteristics captured immediately before and biometric characteristics captured immediately after a change in the speed and/or in the direction of the finger while writing the signature in order to determine a distortion of the biometric characteristics during the change of speed and/or direction; and
- comparing the distortion with a minimum threshold and with a maximum threshold in order to verify that this distortion is compatible with a real finger.

The biometric characteristics immediately before and immediately after moments of greatest changes of travel speed and/or direction in the sequence of writing the signature are compared in order to verify that said moments correspond to the greatest variations of distortion of the fingerprint. These variations should be greater than a minimum threshold, but nevertheless bounded by a maximum, and they should be in the expected direction relative to the movement of the finger. These minimum and maximum distortions, and these directions, are determined by training on databases acquired with the device of the invention. The minimum and the maximum may either be absolute, or else they may depend on the local variation in the speed and on the direction of movement while writing the signature, which relationship is also established by training on real data.

It can be understood that in the event of a fraud making use of a fake finger, the deformation of the fake finger caused by the changes of speed and/or direction, and thus the distortion of the fingerprint of the fake finger, depend on the material from which the fake finger is made. If it is too flexible, the distortion will be greater than the expected distortion; if it is too hard, the distortion will be less than the expected distortion.

Naturally, the invention is not limited to the implementations and embodiments described, but covers any variant coming within the ambit of the invention as defined by the claims.

In particular, the signature may specify a quality or a function of an individual. For example, in order to access a computer network, provision may be made for the server to ask the user to write on the acquisition surface of the sensor the quality of the access, administrator or user, that the user seeks for connection to the network. It is necessary for the user to have been enrolled previously, i.e. it is necessary for signature data to have been stored on the server corresponding to the ways in which the user writes the words "administrator" and/or "user", together with the fingerprint biometric data corresponding to the finger used by the user for writing the signature. It should be observed that a single individual may have a plurality of qualities. Provision may also be made for the signatures to be associated with biometric characteristics of different fingers.

For a given individual, the data medium may contain signature data corresponding to a plurality of written signatures together with fingerprint biometric data corresponding to a plurality of fingers. Thus, an "identity" or a function or a right of the user may be associated with each written signature and fingerprint pair. It is also possible to have a single identity for a plurality of written signature and fingerprint pairs in order to allow several different fingers to be used equally well so that recognition can be performed even when a finger is injured. Likewise, it is possible to have a plurality of identities for the same biometric data (but with different signatures). The invention is particularly advantageous since it makes it possible to separate the identity from the biometric data of the individual. An individual can thus select which identity to use and can abandon a preceding identity by changing signature.

Provision may be made for the signature to be changed periodically.

In order to make the sensor, several possibilities exist, and in particular:
  an unmodified signature sensor: it may be a prism optical sensor or a flat sensor (of the TFT type, i.e. constituted by pixels deposited on a thin substrate of glass or plastic, using microelectronic or printing methods). The sensor must nevertheless have an area and a data rate that are sufficient;
  a partially transparent TFT sensor having an emitting screen placed under it. This makes it possible to significantly improve the ergonomics of writing a signature by displaying a "trace";
  a sensor/display, i.e. a single substrate having deposited thereon display pixels (e.g. organic light-emitting diodes (OLEDs), or indeed a liquid crystal display (LCD)) together with detection pixels (e.g. optical or capacitive);
  a prism optical sensor with a thermal infrared (TIR) sensor or with a Fourier transform infrared (FTIR) sensor;
  an optical sensor imaging a finger placed on a parallel-faced plate;
  an ultrasound sensor;
  a thermal sensor;
  a capacitive sensor; and
  a pressure sensor.

It should be observed that any fingerprint sensor of sufficient area and of sufficient acquisition speed enables the invention to be performed on being associated solely with the software needed for extracting signature data and biometric data, and then comparing that data with reference data.

The signature may be detected using an ultrasound sensor arranged in the vicinity of an edge of the front face 2.2 of the transparent window 2.

The signature is preferably detected directly by the fingerprint sensor. Two approaches can then be used: either use is made solely of the centroid and the shape of the contact area of the finger, or else use is made of a fingerprint comparison algorithm (or any other optical stream algorithm) in order to follow the movement of the finger and relying on the pattern of the fingerprint. This latter approach enables the orientation of the finger to be determined while it is writing the signature, thereby constituting additional information about the signature.

The signature data may include data concerning the pressure of the finger against the signature surface over at least a portion of the signature. By way of example, this data may be supplied directly by a pressure sensor associated with the capture surface. The pressure data may be determined indirectly by measuring the contact area of the finger against the capture surface. This pressure data can thus be represented by variations in the contact area of the finger while writing the signature.

The device may be arranged so as to operate in only one of the modes of operation.

The algorithm used may be split into two portions: extracting a template, and comparing the template with one or more reference templates.

In a variant, provision may be made for one database for the signature data and another database for the biometric data. Specifically, an important advantage of the invention is that it is possible to envisage protecting the biometric data by means of the signature data. This then procures an advantage by protecting the biometric data (data that cannot be repudiated) by data that can be repudiated (since it is possible to change the signature). Several solutions can be envisaged. When the two databases are separate, it is possible to identify an individual from the signature database, and then verify the biometric data for that identified individual (it should be observed that with such a scheme, no use is made of a biometric identification service).

In a variant, the reference data may be stored in a server that is remote from the sensor and/or comparison therewith may be performed by a server that is remote from the sensor. Provision then needs to be made for means enabling communication to be made secure between the sensor and the server.

The display is not essential, but it is advantageous since it makes it possible to use a signature that is more accurate and patterns that are more complicated, with the finger being lifted and put down again at the right location (e.g. to dot an i).

The biometric characteristics conserved for comparison are preferably those that were captured during a stage of slow movement of the finger while writing the signature, said speed optionally being a zero speed.

The data medium may be a memory incorporated in an article accompanying the individual, such as: a token, a chip, a badge, an identity document, a smartphone type mobile telephone, . . . .

The invention claimed is:

1. A method of recognizing individuals by means of at least one processor executing a recognition algorithm, comprising the steps of:

causing at least one candidate for recognition to write a signature, the candidate using at least one finger pressed against a capture surface and writing his signature on the capture surface by sliding his finger on said capture surface;

detecting fingerprint biometric characteristics of the writing finger of the candidate during at least a first capture time and a second capture time while writing said signature, at least one of the detection during the first capture time and of detection during the during the second capture time being performed while the finger is moving;

extracting both the characteristics of the written signature and also the fingerprint biometric characteristics in order to form signature data and biometric data of the candidate; and comparing the signature data and the biometric data of the candidate with signature data and fingerprint biometric data of at least one individual as stored in at least one data medium, and comparing the biometric data detected during the first capture time and the biometric data detected during the second capture time in order to reveal distortion of the biometric characteristics between the two capture times.

2. The method according to claim 1, wherein, during at least one of the first and second capture times, the biometric characteristics are captured while the finger is moving slowly while the signature is being written.

3. The method according to claim 1, wherein the biometric characteristics are detected substantially continuously while the signature is being written.

4. The method according to claim 3, including the steps of determining deformation vectors for the biometric characteristics while the signature is being written and of comparing the deformation vectors as determined with deformation vectors stored in the data medium.

5. The method according to claim 1, including the steps of:

comparing biometric characteristics captured immediately before and immediately after a change of speed and/or of direction of the finger while writing the signature in order to determine distortion of the biometric characteristics during the change of speed and/or of direction; and comparing the distortion with a minimum threshold and with a maximum threshold in order to verify that the distortion is compatible with a real finger.

6. The method according to claim 1, wherein the signature data comprises the general shape of the signature together with at least one of the following values:

a value for the acceleration of the finger over at least a portion of the signature;

a value for the pressure of the finger against the signature surface over at least a portion of the signature; and a value for the orientation of the finger.

7. The method according to claim 1, wherein the stored fingerprint biometric data comes from fingerprint biometric characteristics detected on a stationary finger.

8. The method according to claim 1, wherein the biometric data stored in the data medium comes from fingerprint biometric characteristics detected on a moving finger.

9. The method according to claim 1, wherein the data medium is a memory of a processor implementing a database containing signature data and finger biometric data for a plurality of individuals.

10. The method according to claim 1, wherein the data medium is a memory incorporated in an article accompanying the individual.

11. The method according to claim 1, wherein the biometric data is stored in encrypted form, and the signature data is used to constitute a key for encrypting the biometric data.

12. The method according to claim 11, wherein the biometric data is stored in encrypted form, and the signature data is used for accessing the encryption key.

13. A device for detecting biometric characteristics, the device including a sensor having a capture surface, the sensor having an acquisition speed that is sufficient to capture biometric characteristics from the end of a finger writing a signature on the signature surface, the device including a memory for storing the captured biometric characteristics and the written signature, and a processor unit arranged for performing the method according to claim 1.

14. The device according to claim 13, the sensor being semitransparent and the device including a screen arranged behind the sensor and controlled to display the signature as it is being written.

* * * * *